US012777251B2

(12) United States Patent
Jung et al.

(10) Patent No.: US 12,777,251 B2
(45) Date of Patent: Oct. 27, 2026

(54) CAMERA MODULE INCLUDING VIDEO STABILIZER, VIDEO STABILIZER, AND METHOD OF OPERATING THE SAME

(71) Applicant: Samsung Electronics Co., Ltd., Suwon-si (KR)

(72) Inventors: Hyeyun Jung, Suwon-si (KR); Seongwook Song, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 56 days.

(21) Appl. No.: 18/581,176

(22) Filed: Feb. 19, 2024

(65) Prior Publication Data

US 2024/0292100 A1 Aug. 29, 2024

(30) Foreign Application Priority Data

Feb. 24, 2023 (KR) ........................ 10-2023-0025283

(51) Int. Cl.
*H04N 23/68* (2023.01)
*G06T 7/11* (2017.01)

(52) U.S. Cl.
CPC ............. *H04N 23/683* (2023.01); *G06T 7/11* (2017.01); *H04N 23/6845* (2023.01); *G06T 2207/10016* (2013.01); *G06T 2207/20132* (2013.01)

(58) Field of Classification Search
CPC . G06T 2207/10016; G06T 2207/20132; G06T 7/11; H04N 23/6811; H04N 23/6812; H04N 23/683; H04N 23/6845; H04N 23/687
See application file for complete search history.

(56) References Cited

U.S. PATENT DOCUMENTS 9,538,081 B1 * 1/2017 Zhou ...................... H04N 23/68
10,848,746 B2 11/2020 Han et al.
10,911,677 B1 2/2021 Zhou et al.
10,957,029 B2 3/2021 Ichihashi et al.
11,140,330 B2 10/2021 Yi et al.
11,158,026 B1 10/2021 Kamal et al.
11,172,145 B2 11/2021 Lee et al.
11,190,689 B1 11/2021 Wang et al.
12,489,956 B2 * 12/2025 Chen ...................... G10L 15/26
2015/0145950 A1 5/2015 Murphy et al.
2018/0007315 A1 1/2018 Kim et al.
2019/0052810 A1 * 2/2019 Tsubaki ................. H04N 23/95
2021/0306574 A1 9/2021 Cao et al.
2022/0053133 A1 2/2022 Wang et al.
2022/0279124 A1 9/2022 Huang
2022/0343520 A1 10/2022 Bian et al.
2022/0345605 A1 * 10/2022 Chuang ..................... G06T 5/92

* cited by examiner

*Primary Examiner* — Antoinette T Spinks
(74) *Attorney, Agent, or Firm* — Harness, Dickey & Pierce, P.L.C.

(57) ABSTRACT

A camera includes a first image sensor, a second image sensor, and processing circuitry configured to, generate target synthetic image data based on a target first frame from the plurality of first frames and a target second frame from the plurality of second frames, the target second frame corresponding to the target first frame, determine whether to perform an image stabilization operation on the target synthetic image data based on distance data related to distances of one or more objects included in the target synthetic image data, and perform the image stabilization operation based on results of the determination.

20 Claims, 14 Drawing Sheets

CAMERA MODULE INCLUDING VIDEO STABILIZER, VIDEO STABILIZER, AND METHOD OF OPERATING THE SAME

CROSS-REFERENCE TO RELATED APPLICATION

This U.S. non-provisional application claims the benefit of priority under 35 U.S.C. § 119 to Korean Patent Application No. 10-2023-0025283, filed on Feb. 24, 2023, in the Korean Intellectual Property Office, the disclosure of which is incorporated by reference herein in its entirety.

BACKGROUND

Various example embodiments of the inventive concepts relate to a video stabilizer performing a video stabilization operation, a camera module including a video stabilizer, and/or a method of operating a video stabilizer, etc.

As information technology (IT) has developed, various types of electronic devices have been developed and distributed. In particular, portable electronic devices having various functions, such as smartphones, tablet personal computers (PCs), smart watches, etc., have been widely distributed. Also, cameras have been recently attached to portable electronic devices, such as smartphones, tablet PCs, etc., and users are likely to capture images in everyday life by using the cameras.

When a user photographs an external object while holding an electronic device including a camera with their hands, the camera may be shaken during the image capture process. When the hands shake during capturing of images, image quality of generated images may deteriorate. Recently, electronic devices having cameras attached thereto have been developed to have high magnification and high pixels, and thus, it is important to obtain clear images. However, when an image is corrected by compensating for movements of an electronic device due to trembling of the hand of the user, an angle of view of the image may be reduced.

Accordingly, technology for decreasing and/or minimizing the loss in the viewing angle of the image is desired and/or necessary.

SUMMARY

Various example embodiments of the inventive concepts provide a video stabilizer for decreasing and/or minimizing the loss in a viewing angle of an image and performing an image stabilization operation stably by determining image data, on which an image stabilization operation is to be performed, based on distance data and performing the image stabilization operation, a camera including the video stabilizer, and/or a method of operating the video stabilizer, etc.

According to at least one example embodiment of the inventive concepts, a camera includes a first image sensor configured to generate first image data by converting light incident to the first image sensor via a first lens into at least one first electrical signal, the first image data including a plurality of first frames, a second image sensor configured to generate second image data by converting light incident to the second image sensor via a second lens into at least one second electrical signal, the second image data including a plurality of second frames, and processing circuitry configured to, generate target synthetic image data based on a target first frame from the plurality of first frames and a target second frame from the plurality of second frames, the target second frame corresponding to the target first frame, determine whether to perform an image stabilization operation on the target synthetic image data based on distance data related to distances of one or more objects included in the target synthetic image data, and perform the image stabilization operation based on results of the determination.

According to at least one example embodiment of the inventive concepts, a video stabilizer includes processing circuitry configured to, receive first image data of a target first frame generated through a first lens, and second image data of a target second frame generated through a second lens, the first lens having a wider viewing angle than the second lens, identify image data on which an image stabilization operation is to be performed, perform the image stabilization operation on the identified image data, generate target synthetic image data based on a first region in the target second frame and the target first frame, the first region not corresponding to the target first frame, and identify the image data on which the image stabilization operation is to be performed based on information related to distances associated with at least one object located on a boundary between the first region and a second region, the second region corresponding to the target first frame.

According to at least one example embodiment of the inventive concepts, a method of operating a camera, the method includes receiving first image data of a target first frame generated through a first lens and second image data of a target second frame generated through a second lens, the second lens having a wider viewing angle than the first lens, generating target synthetic image data by rectifying a first region in the target second frame and the target first frame, the first region not corresponding to the target first frame, identifying image data on which an image stabilization operation is to be performed based on information related to distances of at least one object located on a boundary between the first region and a second region, the second region corresponding to the target first frame, and performing the image stabilization operation on the identified image data.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various example embodiments of the inventive concepts will be described in detail with reference to accompanying drawings.

Figure 1:
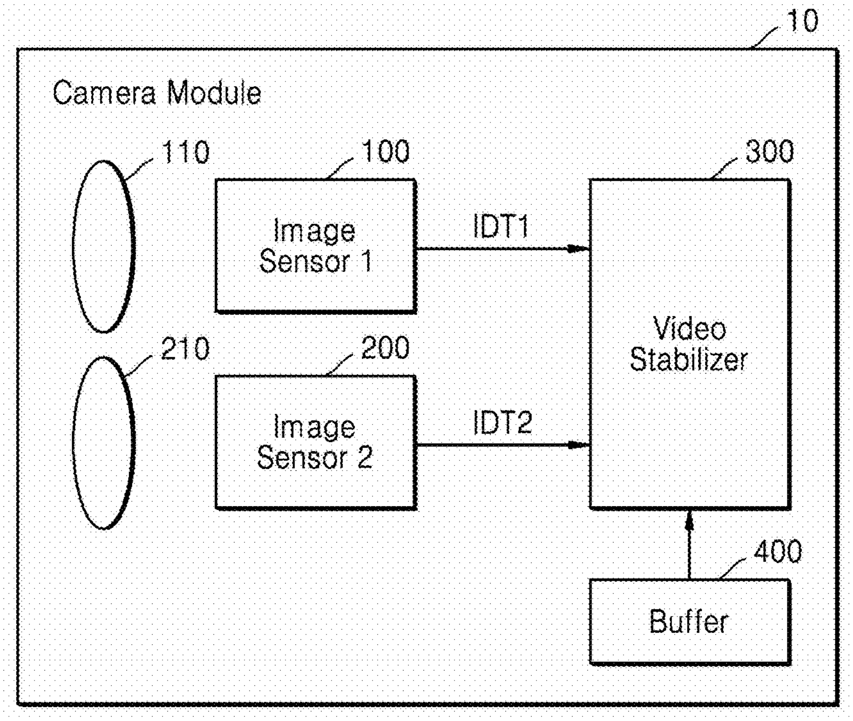
FIG. 1 is a block diagram of a camera module according to at least one example embodiment of the inventive concepts.

FIG. 1 is a block diagram of a camera module 10 according to at least one example embodiment of the inventive concepts.

Referring to FIG. 1, the camera module 10 (e.g., camera, camera device, etc.) may include a first image sensor 100, a first lens 110, a second image sensor 200, a second lens 210, a video stabilizer 300, and/or a buffer 400, etc., but the example embodiments are not limited thereto, and for example, the camera module may include a greater or lesser number of constituent components, etc. According to some example embodiments, the camera module 10, first image sensor 100, second image sensor 200, video stabilizer 300, and/or buffer 400, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The camera module 10 may capture and/or store an image of at least one object by using at least one image sensor such as a charge coupled device (CCD), a complementary metal oxide semiconductor (CMOS), etc., and may be implemented as a digital camera, a digital camcorder, a mobile phone, a smart phone, a tablet, a personal computer (PC), a laptop, a security camera, etc., and/or part of a portable electronic device, etc., but is not limited thereto. The portable electronic device may include, for example, a laptop computer, a mobile phone, a smartphone, a tablet, a personal digital assistant (PDA), an enterprise digital assistant (EDA), a digital still camera, a digital video camera, a portable multimedia player (PMP), a personal navigation device (PND), a handheld game console, an e-book, a wearable device, etc. Also, the camera module 10 may be loaded in an electronic device, such as a drone, an advanced drivers assistance system (ADAS), etc., or an electronic device provided as a component in a vehicle, furniture, manufacturing equipment, various measurement devices, etc.

The camera module 10 may photograph (e.g., capture an image, take an image, etc.) at least one object (e.g., target object, target, etc.) outside of the camera module 10 by generating image data corresponding to the at least one object and performing at least one of various image processing operations on the image data, etc. To do this, the camera module 10 may include, e.g., the first and second lenses 110 and 210, the first and second image sensors 100 and 200, and may also include an image signal processor, etc., but the example embodiments are not limited thereto, and for example, the camera module 10 may include a greater or lesser number of lenses, image sensors, and/or image signal processors, etc. The image signal processor may include the video stabilizer 300, or the image signal processor and the video stabilizer 300 may be separately implemented. For the convenience of description, FIG. 1 only shows the video stabilizer 300, but the example embodiments are not limited thereto. The image processing operations are performed on first and second image data IDT1 and IDT2 received from the image sensors 100 and 200 by the image processor, and the video stabilizer 300 may receive the image data IDT1 and IDT2 on which the image processing operations have been performed, etc.

The image processing operations may include an image processing operation for converting a data type (e.g., changing image data of Bayer pattern into YUV type and/or RGB type, etc.), and/or an image processing operation for improving image quality, e.g., noise removal, brightness adjustment, sharpness adjustment, etc., with respect to the first and second image data IDT1 and IDT2. For example, the image processing operations may include various operations, such as a bad pixel correction (BPC) operation, a lens shading correction (LSC) operation, a cross-talk (X-talk) correction operation, a white balance (WB) correction operation, a remosaic operation, a demosaic operation, a denoise operation, a deblurring operation, a gamma correction operation, a high dynamic range (HDR) operation, a tone mapping operation, etc. However, the image processing operations are not limited to the above examples.

The lenses 110 and 210 condense light reflected by the at least one object on the outside of the camera module 10. The lenses 110 and 210 may provide the condensed light to the image sensors 100 and 200, etc.

The first and second image sensors 100 and 200 may generate the first and second image data IDT1 and IDT2 by converting the light condensed by the lenses 110 and 210 into electrical signals. To do this, the first and second image sensors 100 and 200 may have pixel arrangements in which a plurality of pixels are two-dimensionally arranged. For example, one of a plurality of reference colors may be assigned to each of the plurality of pixels. For example, the plurality of reference colors may include red, green, and blue (RGB) and/or red, green, blue, and white (RGBW), etc. In a non-limiting example, the first and second image sensors 100 and 200 may be implemented by using a charge coupled device (CCD) and/or a complementary metal oxide semiconductor (CMOS), but is not limited thereto. The first and second image data IDT1 and IDT2 generated by the first and second image sensors 100 and 200 may be generated as various types of data, e.g., frame data, etc. The first and second image data IDT1 and IDT2 may include image data of a plurality of frames, but are not limited thereto. The plurality of frames may be output respectively from the first and second image sensors 100 and 200 in the form of the first and second image data IDT1 and IDT2, etc.

The camera module 10 may include the plurality of lenses 110 and 210 and the plurality of image sensors 100 and 200 corresponding to the plurality of lenses. The first image sensor 100 may generate the first image data IDT1 by converting the light condensed by the first lens 110 into a first electrical signal. The first image sensor 100 may generate the first image data IDT1 of each of a plurality of first frames.

The second image sensor 200 may generate the second image data IDT2 by converting the light condensed by the second lens 210 into a second electrical signal. The second image sensor 200 may generate the second image data IDT2 of each of a plurality of second frames.

In at least one example embodiment, the first frame and the second frame may have different viewing angles, but are not limited thereto. The first image sensor 100 and the second image sensor 200 may have different angles of view. The first image sensor 100 may have a relatively narrow angle of view in comparison to the second image sensor 200, and the second image sensor 200 may have a relatively wide angle of view in comparison to the first image sensor 100, etc. For example, based on a common region between the first frame and the second frame, the first image sensor 100 may have relatively high pixels but a narrow angle of view, and the second image sensor 200 may have relatively low pixels but a wide angle of view, but the example embodiments are not limited thereto. Here, the first image sensor 100 may be referred to as a tele-sensor (e.g., telescopic image sensor, an image sensor with zoom capabilities, etc.), and the second image sensor 200 may be referred to as a wide-sensor (e.g., a wide-angle image sensor, etc.), but the example embodiments are not limited thereto. The first frame may have a narrower angle of view than the second frame, and the second frame may have a relatively wide angle of view, etc. The size of the first frame may be less than that of the second frame, and the size of the second frame may be relatively wide, etc.

The video stabilizer 300 may perform an image stabilization operation on image data provided from the first and/or second image sensors 100 and 200, etc. The first and second image data IDT1 and IDT2 may be stored in the buffer 400, and the image data IDT1 and IDT2 may be provided from the buffer 400 to the video stabilizer 300. The video stabilizer 300 may compensate for the movement of the camera module 10 in the image data by obtaining information about and/or related to the movement of the camera module 10. The video stabilizer 300 may perform a digital image stabilization operation on the image data. The digital image stabilization operation may be referred to as an electronic image stabilization operation. For example, the video stabilizer 300 may be activated to operate in a photography mode obtaining a plurality of pieces of image data, e.g., a video mode, a time-lapse photographing mode, and/or a panorama-photographing mode, etc., of an electronic device including the camera module 10.

The video stabilizer 300 may receive target first image data from the first image sensor 100. The video stabilizer 300 may receive target second image data from the second image sensor 200. The target first image data may denote image data of a target first frame. The target first frame may denote a current first frame on which the image stabilization operation is to be performed from among the plurality of first frames. The target second image data may denote image data of a target second frame. The target second frame may correspond to the target first frame, but is not limited thereto. The target second frame may include at least one object within the first frame and objects in a peripheral region of the at least one object, but is not limited thereto. The target first frame and the target second frame may be obtained at similar and/or the same time points.

The video stabilizer 300 may generate target synthetic image data by using the target first image data and the target second image data, but is not limited thereto. The target second frame may have a wider angle of view than that of the target first frame, but is not limited thereto. The target second frame may have less pixels than the first frame and may have a wider angle of view than that of the target first frame, but is not limited thereto. In at least one example embodiment, the video stabilizer 300 may generate target synthetic image data by rectifying (e.g., modifying, adjusting, correcting, repairing, improving, etc.) parts of the target first image data and/or the target second image data, etc. The synthetic image data is described in greater detail below in connection to FIG. 2.

The video stabilizer 300 may determine and/or identify image data on which the image stabilization operation is to be performed. The video stabilizer 300 may determine whether to perform the image stabilization operation on the target synthetic image data based on data, e.g., distance data, etc., representing information related to and/or corresponding to a distance between the object included in the target synthetic image data and the lenses 110 and 210, etc.

The video stabilizer 300 may determine and/or identify the image data, on which the image stabilization operation is to be performed, based on the distance data between an object located and/or arranged on a boundary between a first region that does not correspond to the target first frame and a second region corresponding to the target first frame in the target synthetic image data and the lenses 110 and 210, etc. The image data on which the image stabilization is to be performed may not be determined based on the distance data between the object that is only included in the first region or the second region (e.g., on objects that appear in a single region, etc.), not in the boundary between the first region and the second region, and the lenses 110 and 210, etc.

In at least one example embodiment, the distance data may include a disparity and/or a difference of one or more objects included in the boundary between the first region and the second region in the target synthetic image data. The disparity may be expressed and/or calculated as a depth map and may denote and/or indicate the distance between the object and the lenses 110 and 210, but the example embodiments are not limited thereto. The video stabilizer 300 may determine the image data on which the image stabilization operation is to be performed based on the disparity of each of the one or more objects included in the boundary between the first region and the second region. The video stabilizer 300 may determine one of the target synthetic image data and the target first image data as the image data on which the image stabilization operation is to be performed according to the disparity, etc.

In at least one example embodiment, the distance data may include a segmentation (e.g., segment, a frame included in the image data, etc.,) of each of the one or more objects included in the boundary between the first region and the second region in the target synthetic image data. The segmentation denotes and/or includes extracting objects included in the image data, and distinguishing between an identical object and a different object through the segmentation. There may be discontinuity at the boundary between the first region and the second region according to and/or based on the distance between the object and the lenses 110 and 210. The video stabilizer 300 may determine the image data on which the image stabilization operation is to be performed based on the segmentation of each of the one or more objects included in the boundary between the first region and the second region. The video stabilizer 300 may determine one of the target synthetic image data and the target first image data as the image data on which the image stabilization operation is to be performed according to and/or based on the discontinuity in the segmentation.

The video stabilizer 300 may perform the image stabilization operation on the determined image data. The video stabilizer 300 may obtain motion information of the camera module 10 by comparing at least some of the plurality of first image frames with the target first frame and may perform the image stabilization operation with respect to the image data determined based on the motion information, or in other words, the video stabilizer 300 may perform at least one image stabilization operation on the image data in response to detection of camera motion based on the motion information, etc. For example, the video stabilizer 300 may perform the image stabilization operation by comparing the target first image frame with k first image frames (k is a positive integer) after the target first image frame. The video stabilizer 300 may perform the image stabilization operation on the determined image data and may crop the image data to a certain size to generate output image data, but is not limited thereto.

The buffer 400 may store the image data IDT1 and/or IDT2, etc. The buffer 400 may store first image data of each of the plurality of first frames and/or second image data of each of the plurality of second frames, etc. The video stabilizer 300 may perform the image stabilization operation by using at least some (e.g., a portion and/or subset) of the image data of the plurality of first frames and the plurality of second frames stored in the buffer 400. For example, the video stabilizer 300 may perform the image stabilization operation on the image data determined by using k first image frames after the target first image frame stored in the buffer 400, but is not limited thereto.

According to the camera module 10 of at least one example embodiment of the inventive concepts, the second image is used when performing the image stabilization operation on the first image data, and thus, the decrease in and/or loss of the angle of view of the first image data due to the image stabilization operation may be reduced. The synthetic image data is generated by rectifying part of the first image data and part of the second image data, and the synthetic image data is cropped into a frame size of the first image data, and thus, the loss in the angle of view of the first image data may be reduced.

Also, according to the camera module 10 at least one example embodiment of the inventive concepts, the image data on which the image stabilization operation is to be performed is determined based on the distance data, and the image stabilization operation is performed on the determined image data to generate stabilized and/or high-quality images, etc.

Figure 2:
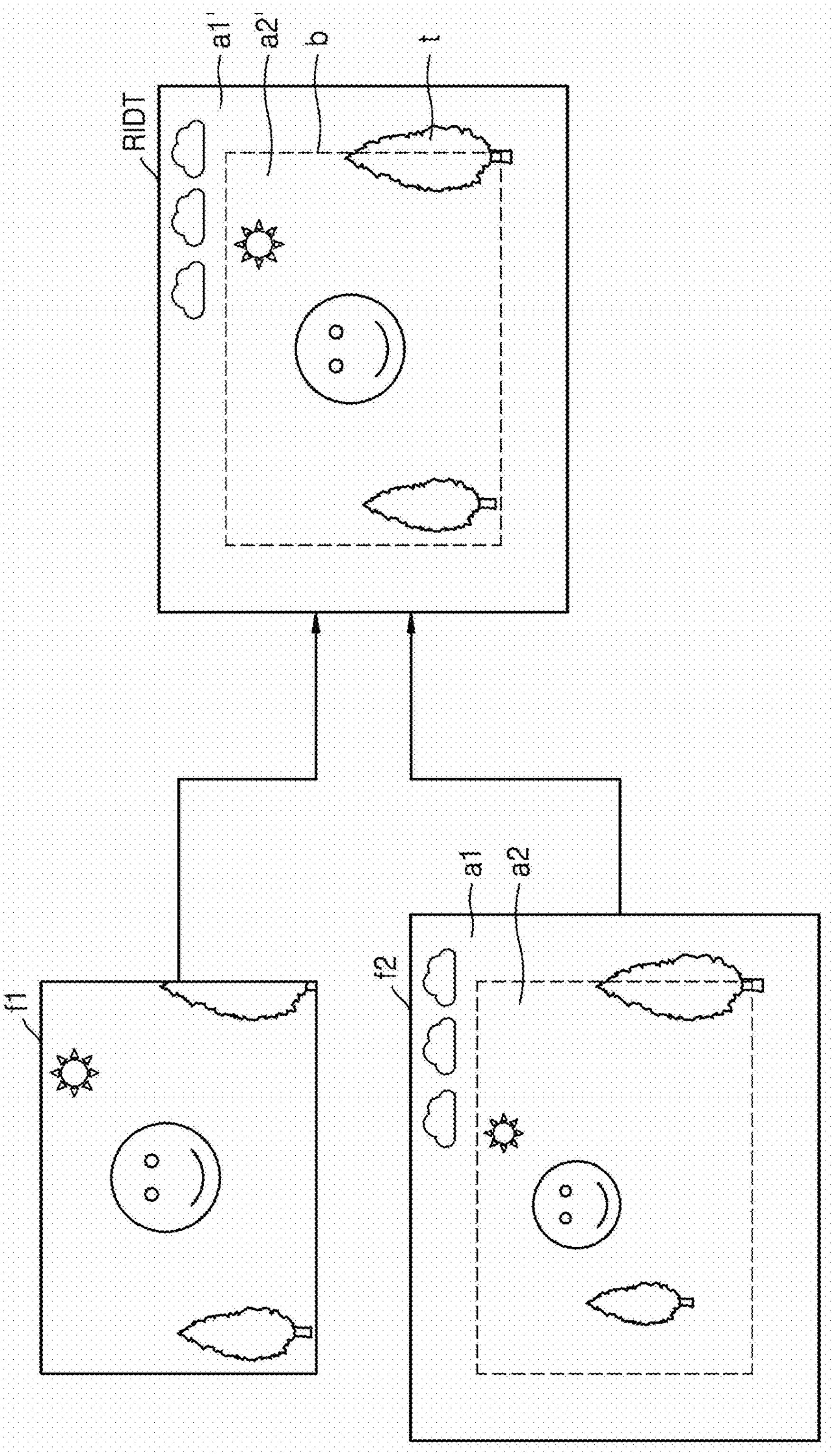
FIG. 2 is a diagram for describing synthetic image data according to at least one example embodiment of the inventive concepts.

FIG. 2 is a diagram for describing synthetic image data according to at least one example embodiment of the inventive concepts.

Referring to FIG. 2, a second frame f2 may include a plurality of regions, e.g., a first region a1 and a second region a2, etc., but the example embodiments are not limited thereto, and for example, the second frame f2 may include a greater or lesser number of regions. The second frame f2 may have wider angle of view than that of a first frame f1, but is not limited thereto. The second frame f2 may have less pixels than the first frame f1, but is not limited thereto. The first region a1 may denote a region not corresponding to the first frame f1, and the second region a2 may denote a region corresponding to the first frame f1. Because the second region a2 corresponds to the first frame f1, the second region a2 may have the same size as that of the first frame f1. The first region a1 may be a remaining region other than the second region a2 in the second frame f2.

The video stabilizer (e.g., the video stabilizer 300 of FIG. 1) may generate synthetic image data RIDT by using and/or based on the first image data and the second image data, etc. The video stabilizer may generate the synthetic image data RIDT by rectifying parts of the first image data and the second image data, etc.

In at least one example embodiment, the video stabilizer may generate the synthetic image data RIDT by rectifying the first frame f1 and the first region a1 of the second frame f2, etc. The synthetic image generated by rectifying the first frame f1 and the first region a1 of the second frame f2 may be of the form of synthetic image data RIDT, but in FIG. 2, the synthetic image data RIDT is shown as an image for convenience of description and the example embodiments are not limited thereto.

In the synthetic image data RIDT, a second region a2' may be the same as the first frame f1 and a first region a1' may be the same as the first region a1 of the second frame f2, but the example embodiments are not limited thereto. For example, the second region a2' of the synthetic image data RIDT may be the first image data of the first frame f1, and the first region a1' of the synthetic image data RIDT may be the second image data of the first region a1 in the second frame f2, etc. For example, the video stabilizer may generate the target synthetic image data by rectifying the target first frame f1 and the first region a1' of the target second frame f2, etc. In the synthetic image data RIDT, the resolution of the first region a1' may deteriorate, may be reduced, may decrease, etc. The resolution of the first region a1' may be improved, may be increased, etc., through a resolution technique, such as super resolution, etc.

Figure 3:
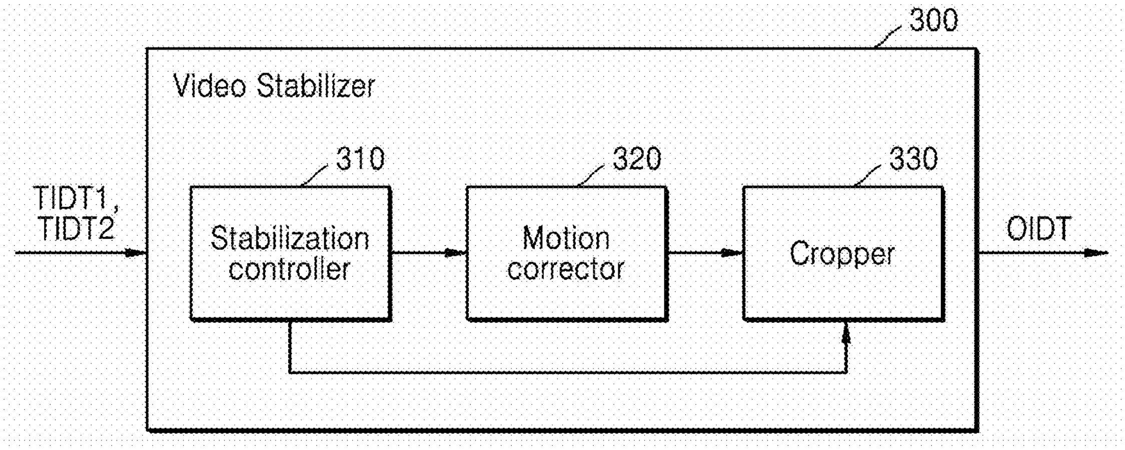
FIG. 3 is a diagram for describing a video stabilizer according to at least one example embodiment of the inventive concepts.

FIG. 3 is a diagram for describing the video stabilizer 300 according to at least one example embodiment of the inventive concepts. According to at least one example embodiment, the video stabilizer 300 of FIG. 3 corresponds to the video stabilizer 300 of FIG. 1, but the example embodiments are not limited thereto. Detailed descriptions of the video stabilizer is omitted due to avoid redundancy.

The video stabilizer 300 may receive first image data and/or second image data, etc., but is not limited thereto. The video stabilizer 300 may receive target first image data TIDT1 of a target first frame and/or target second image data TIDT2 of a target second frame, etc. The target second frame may have a wider angle of view than that of the target first frame, but the example embodiments are not limited thereto.

Referring to FIG. 3, the video stabilizer 300 may include a stabilization controller 310, a motion corrector 320, and/or a cropper 330, etc., but is not limited thereto. The stabilization controller 310 may generate target synthetic image data by using the target first image data and/or the target second image data, etc. The target second frame may have a wider angle of view than that of the target first frame, but is not limited thereto. In at least one example embodiment, the stabilization controller 310 may generate target synthetic image data by rectifying (e.g., modifying, adjusting, correcting, repairing, improving, etc.) the target first image data and part (e.g., a subset, a portion, etc.) of the target second image data. For example, the stabilization controller 310 may generate the synthetic image data by rectifying the target first frame and a first region of the target second frame, but the example embodiments are not limited thereto. According to some example embodiments, the stabilization controller 310, the motion corrector 320, and/or the cropper 330, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The stabilization controller 310 may determine and/or identify the image data on which the image stabilization operation is to be performed. The stabilization controller 310 may determine whether to perform the image stabilization operation on the target synthetic image data based on distance data representing information related to and/or corresponding to a distance between the object included in the target synthetic image data and the lenses. The distance data may be determined, calculated, etc., by using a disparity map, a light induced detection and ranging (LIDAR) and/or time-of-flight (TOF) technique, etc.

The stabilization controller 310 may determine and/or identify the image data on which the image stabilization operation is to be performed based on distance data between an object located on a boundary between a first region that does not correspond to the target first frame and a second region corresponding to the target first frame and the lenses in the target synthetic image data. Hereinafter, descriptions are also provided with reference to FIG. 2, but the example embodiments are not limited thereto. A boundary b may be a boundary between the first region a1' and the second region a2' in the target synthetic image data RIDT. The stabilization controller 310 may determine and/or identify the image data on which the stabilization operation is to be performed based on the distance data between the object included in the boundary b and the lens of the camera module (e.g., the camera module 10 of FIG. 1, etc.). For example, the object included in the boundary b may be a tree t, in the target synthetic image data RIDT, but is not limited thereto.

In at least one example embodiment, the stabilization controller 310 may determine the image data on which the image stabilization operation is to be performed based on the disparity (e.g., change and/or difference in distance, etc.) of each of the one or more objects included in the boundary b of the first region a1' and the second region a2'. The stabilization controller 310 may determine one of the target synthetic image data and the target first image data as the image data on which the image stabilization operation is to be performed according to and/or based on the disparity. For example, the stabilization controller 310 may determine the image data on which the image stabilization operation is to be performed based on the disparity of the tree t that is the object included in the boundary b, etc. The method of determining the image data on which the image stabilization operation is to be performed based on the disparity is described in greater detail below in connection to FIGS. 5A and 5B.

The stabilization controller 310 may determine and/or identify the image data on which the image stabilization operation is to be performed according to and/or based on whether the disparity of each of the one or more objects included in the boundary b is all less than a desired and/or preset threshold value. When the disparity of each of the one or more objects included in the boundary b is all less than the desired and/or preset threshold value, the stabilization controller 310 may determine and/or identify the target synthetic image data RIDT as the image data on which the image stabilization operation is to be performed. That is, the stabilization controller 310 may determine and/or identify that the image stabilization operation is to be performed on the target synthetic image data RIDT based on the distance data of one or more objects included in the boundary area and a desired threshold value.

When at least one of the disparities of the one or more objects included in the boundary b is equal to or greater than the desired and/or preset threshold value, the stabilization controller 310 may determine and/or identify the target first image data as the image data on which the image stabilization operation is to be performed. That is, the stabilization controller 310 may determine that the image stabilization operation is not to be performed on the target synthetic image data RIDT.

In at least one example embodiment, the stabilization controller 310 may determine and/or identify the image data on which the image stabilization operation is to be performed based on the segmentation of each of the one or more objects included in the boundary b between the first region a1' and the second region a2'. The stabilization controller 310 may determine one of the target synthetic image data or the target first image data as the image data on which the image stabilization operation is to be performed according to and/or based on the discontinuity in the segmentation. The stabilization controller 310 may determine one of the target synthetic image data or the target first image data as the image data on which the image stabilization operation is to be performed according to and/or based on the segmentation. For example, the stabilization controller 310 may determine the image data on which the image stabilization operation is to be performed based on the segmentation of the tree t that is the object included in the boundary b, etc. The method of determining the image data on which the image stabilization operation is to be performed based on the segmentation is described in greater detail below in connection to FIGS. 5A and 5B.

The stabilization controller 310 may determine the image data on which the image stabilization operation is to be performed according to and/or based on whether the segmentation of each of the one or more objects included in the boundary b is continuous (e.g., all continuous), or in other words, when the one or more objects is properly shown and/or has a same size within the image data, etc., but the example embodiments are not limited thereto. When the segmentations of the respective one or more objects included in the boundary b are continuous and/or all continuous, the stabilization controller 310 may determine the target synthetic image data RIDT as the image data on which the image stabilization operation is to be performed.

When at least one of the segmentations of the respective one or more objects included in the boundary b is discontinuous, e.g., when a portion of the one or more object is not shown properly, the object has a same size within the image data, etc., the stabilization controller 310 may determine the target first image data as the image data on which the image stabilization operation is to be performed. The disparity and the segmentation described above in connection to FIG. 3 may be calculated in the video stabilizer 300 and/or may be calculated outside the video stabilizer 300, according to some example embodiments.

The motion corrector 320 may perform the image stabilization operation based on the determination of the stabilization controller 310. The motion corrector 320 may perform the image stabilization operation on the determined image data. When the stabilization controller 310 determines and/or identifies the target synthetic image data RIDT as the image data on which the image stabilization operation is to be performed, the motion corrector 320 may perform the image stabilization operation on the target synthetic image data RIDT, but the example embodiments are not limited thereto. When the stabilization controller 310 determines and/or identifies the target first image data as the image data on which the image stabilization operation is to be performed, the motion corrector 320 may perform the image stabilization operation on the target first image data.

The cropper 330 may crop image data to a certain and/or desired size on which the image stabilization operation is performed by the motion corrector 320. In detail, the stabilization controller 310 may determine the crop size of the image data on which the image stabilization operation is performed, and the cropper 330 may crop the image data based on the determined crop size, etc. In at least one example embodiment, when the target synthetic image data RIDT is determined as the image data on which the image stabilization operation is to be performed, the stabilization controller 310 may determine, for example, the crop size of the target synthetic image data RIDT as the size of the target first frame, but is not limited thereto. When the image stabilization operation is performed on the target synthetic image data RIDT, the cropper 330 may crop, to the same size as that of the target first frame, the target synthetic image data RIDT on which the image stabilization operation is performed, but is not limited thereto.

In at least one example embodiment, when the target first image data is determined as the image data on which the image stabilization operation is to be performed, the stabilization controller 310 may determine the crop size of the target first image data to be smaller than that of the target first frame, but is not limited thereto. When the image stabilization operation is performed on the target first image data, the cropper 330 may crop, to a smaller size than that of the target first frame, the target first image data on which the image stabilization operation is performed, etc.

In at least one example embodiment, when the target synthetic image data RIDT is determined as the image data on which the image stabilization operation is to be performed, the stabilization controller 310 may adjust the crop size of the target synthetic image data RIDT. The stabilization controller 310 may adjust the crop size of the target synthetic image data RIDT based on the distance data corresponding to continuous k (k being a positive integer) reference first frames after and/or following the target first frame, from among the plurality of first frames. The number of continuous k reference first frames may vary. The stabilization controller 310 may adjust the crop size of the target synthetic image data RIDT based on the continuous reference first frames after the target first frame. For example, the number of reference first frames may be 10 or 15, but is not limited thereto.

The stabilization controller 310 may adjust the crop size of the target synthetic image data RIDT based on the distance data of each of the one or more objects located on a boundary between the first region not corresponding to the reference first frame and the second region corresponding to the reference first frame in the synthetic image data corresponding to each of the reference first frames, etc. Each of the reference first frames and the second region of the reference second frame corresponding to each of the reference first frames are rectified with each other to generate the synthetic image data corresponding to each of the reference first frames, etc.

Figure 4:
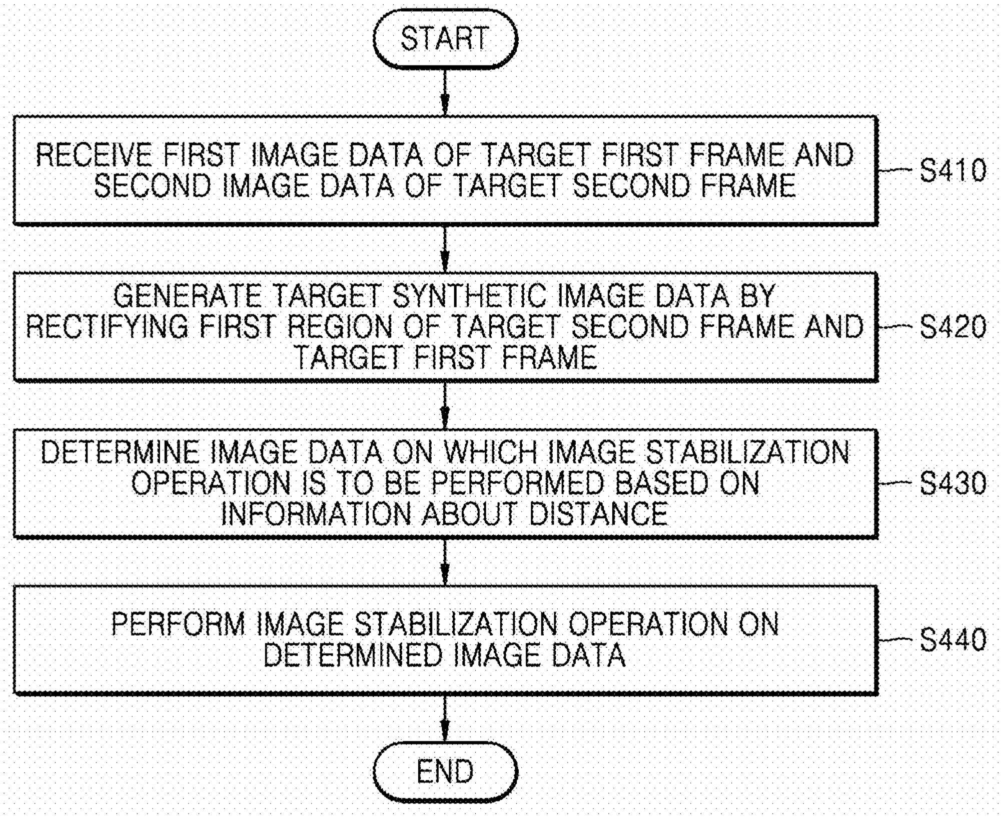
FIG. 4 is a flowchart for illustrating a method of operating a video stabilizer, according to at least one example embodiment of the inventive concepts.

FIG. 4 is a flowchart of a method of operating the video stabilizer 300, according to at least one example embodiment of the inventive concepts. In detail, FIG. 4 is a flowchart for describing the method of operating the video stabilizer 300 of FIG. 3, but the example embodiments are not limited thereto.

In operation S410, the video stabilizer may receive the first image data and/or the second image data, etc., but is not limited thereto. The first image data is generated through a first lens and the second image data is generated through the second lens, etc. A video stabilizer may receive target first image data of a target first frame and/or target second image data corresponding to a target second frame, etc. The target second frame may have a wider angle of view than that of the target first frame, but the example embodiments are not limited thereto.

In operation S420, the video stabilizer may generate target synthetic image data. The target second frame may include a first region that does not correspond to the target first frame and a second region corresponding to the target first frame, but is not limited thereto. The video stabilizer may generate the target synthetic image data by rectifying (e.g., adjusting, modifying, etc.) the first region and/or the target first frame, etc. That is, the target synthetic image data may include the first region of the target second frame and the target first frame.

In operation S430, the video stabilizer may determine and/or identify the image data on which the image stabilization operation is to be performed based on information related to a distance. The video stabilizer may determine and/or identify the image data on which the image stabilization operation is to be performed based on distance data that is information related to the object included in the boundary between the first region and the second region in the target synthetic image data and the lens of a camera module, etc.

In at least one example embodiment, the distance data may include a disparity (e.g., differences in distance, etc.) of each one or more objects included in the boundary between the first region and the second region in the target synthetic image data. The video stabilizer may determine the image data on which the image stabilization operation is to be performed based on the disparity of each of the at least one object included in the boundary between the first region and the second region.

In at least one example embodiment, the distance data may include a segmentation of each of the one or more objects included in the boundary between the first region and the second region in the target synthetic image data. The video stabilizer may determine the image data on which the image stabilization operation is to be performed based on a disparity of an object that simultaneously covers the first region and the second region and is determined as an identical object based on segmentation information, etc.

In operation S440, the video stabilizer may perform the image stabilization operation on the determined image data. The video stabilizer may perform the image stabilization operation on the image data determined based on the motion information. For example, the video stabilizer may perform the image stabilization operation by comparing the target first image frame with k first image frames (where k is a positive integer) after the target first image frame. The video stabilizer may perform the image stabilization operation on the determined image data and may crop the image data to a desired and/or certain size to generate output image data.

Figure 5A:
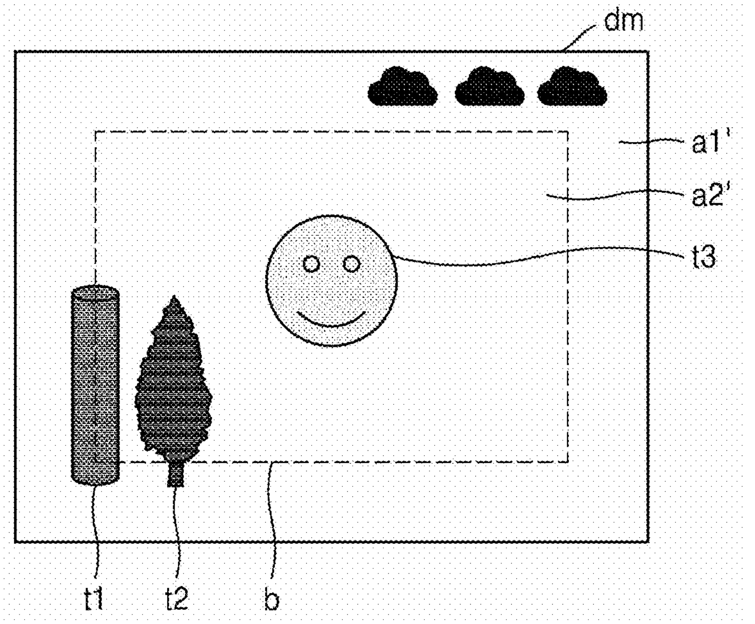
FIG. 5A is a diagram for describing a disparity according to at least one example embodiment of the inventive concepts.

FIG. 5A is a diagram for describing a disparity according to at least one example embodiment of the inventive concepts. Referring to FIG. 5A, a depth map dm denotes a disparity (e.g., differences in distance) of the target synthetic image data. In the depth map dm, the disparity of each object within the target synthetic image data may be expressed. When the distance between the object within the target synthetic image data and the lens is short and/or small, the disparity is high and may be expressed to be bright (e.g., a brighter color, a higher brightness value, etc.), but the example embodiments are not limited thereto. For example, a third object t3 is brighter than a first object t1, a disparity of the third object t3 may be higher than that of the first object t1, etc. The third object t3 may be closer to the lenses of the camera module than the first object t1, etc.

When the distance between the object within the target synthetic image data and the lens is long and/or large, the disparity may be low and may be expressed to be dark (e.g., a darker color, a lower brightness value, etc.). For example, a second object t2 is darker than the first object t1 in FIG. 5A, therefore the disparity of the first object t1 may be lower than that of the second object t2, etc. In other words, the first object t1 may be farther from the lenses of the camera module than the second object t2 as shown in FIG. 5A.

The video stabilizer (e.g., the video stabilizer 300 of FIG. 3, etc.) may determine the image data on which the image stabilization operation is to be performed based on the disparity of the one or more objects included in the boundary b of the first region a1' and the second region a2'. The first object t1 and the second object t2 may be included in the boundary b, but the example embodiments are not limited thereto. The video stabilizer may determine the image data on which the image stabilization operation is to be performed based on the disparity of each of the first object t1 and the second object t2, etc. The video stabilizer 300 may determine one of the target synthetic image data or the target first image data as the image data on which the image stabilization operation is to be performed according to and/or based on the disparity, etc.

When the disparity of each of the one or more objects included in the boundary b is all less than the desired and/or preset threshold value, the video stabilizer may determine the target synthetic image data as the image data on which the image stabilization operation is to be performed. It will be assumed that the disparity of the first object t1 and the second object t2 is less than a threshold value in FIG. 5A, but the example embodiments are not limited thereto. Because the disparity of the first object t1 and the disparity of the second object t2 are all less than the threshold value, the video stabilizer may determine the target synthetic image data as the image data on which the image stabilization operation is to be performed. The video stabilizer may perform the image stabilization operation on the target synthetic image data.

Figure 5B:
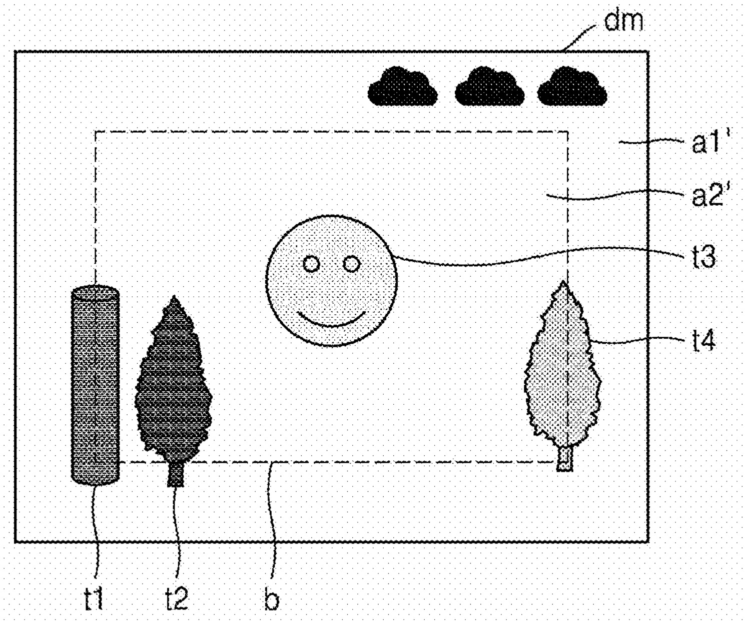
FIG. 5B is a diagram for describing a method of determining image data based on a disparity, according to at least one example embodiment of the inventive concepts.

FIG. 5B is a diagram for describing a method of determining image data based on a disparity, according to at least one example embodiment of the inventive concepts. Descriptions redundant to the description provided above are omitted.

Referring to FIG. 5B, when the object within the target synthetic image data is close to the lens, the disparity is high and may be expressed to be bright (e.g., brighter color, increased brightness value, etc.). For example, a fourth object t4 is brighter than the second object t2, the disparity of the fourth object t4 may be higher than that of the second object t2. The fourth object t4 may be closer to the lenses of the camera module than the second object t2, etc.

When the object within the target synthetic image data and the lens are far from each other, the disparity may be low and may be expressed to be dark (e.g., darker color, lower brightness value, etc.). For example, because the first object t1 is darker than the fourth object t4, the disparity of the first object t1 may be lower than that of the fourth object t4. The first object t1 may be farther from the lenses of the camera module than the fourth object t4, etc.

When at least one of the disparities of the at least one object included in the boundary b is equal to or greater than the desired threshold value, the video stabilizer may determine the target first image data as the image data on which the image stabilization operation is to be performed. The first object t1, the second object t2, and the fourth object t4 may be included in the boundary b, but the example embodiments are not limited thereto. The fourth object t4 may be brighter than the first object t1 and the second object t2, etc. The disparity of the fourth object t4 may be higher than those of the first object t1 and the second object t2, etc. The disparities of the first object t1 and the second object t2 may be less than the desired threshold value and the disparity of the fourth object t4 may be equal to or greater than the desired threshold value, but are not limited thereto. Even when the disparity of the first object t1 and the disparity of the second object t2 are less than the desired threshold value, the video stabilizer may determine the target first image data as the image data on which the image stabilization operation is to be performed because the disparity of the fourth object t4 is equal to or greater than the desired threshold value, etc. The video stabilizer may perform the image stabilization operation on the target first image data, but is not limited thereto. The video stabilizer may perform the image stabilization operation on the target first image data that is smaller than the image size of the target synthetic image data, but the example embodiments are not limited thereto.

Figure 6A:
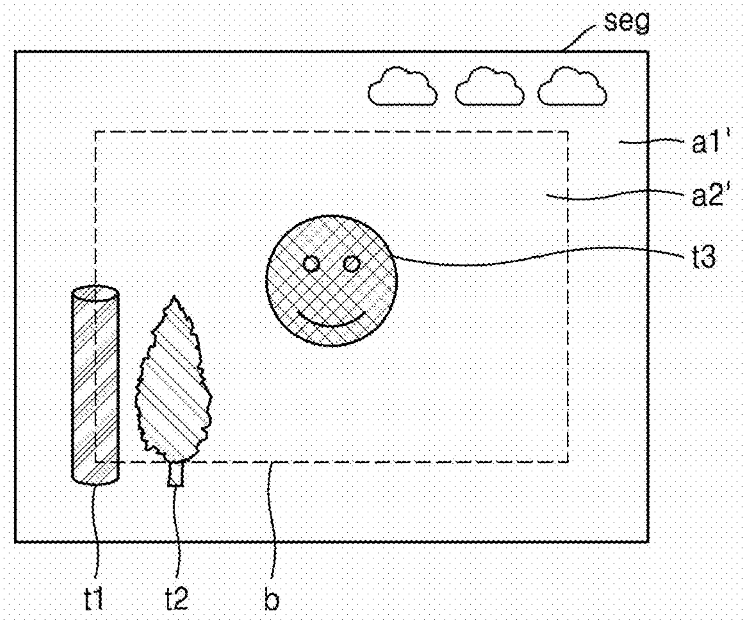
FIG. 6A is a diagram for describing a segmentation according to at least one example embodiment of the inventive concepts.

FIG. 6A is a diagram for describing a segmentation according to at least one example embodiment of the inventive concepts.

Referring to FIG. 6A, seg denotes the segmentation of the target synthetic image data, but the example embodiments are not limited thereto. In the segmentation seg (e.g., an individual frame of a plurality of frames included in the image data, etc.), each of the objects included in the target synthetic image data may be distinguished from another. Continuity of the segmentation of the object may vary depending on the distance between the object within the target synthetic image data and the lens. According to the distance between the object and the lens, the continuities in the segmentations of the objects may be different from each other in the boundary b between the first region a1' and the second region a2', but the example embodiments are not limited thereto.

When the object included in the target synthetic image data is far from the lens, the segmentation of the object included in the boundary b may be continuous. For example, the segmentation of the first object t1 may be continuous on the boundary b. As shown in FIG. 6A, the first object t1 may be far from the lens, but the example embodiments are not limited thereto. The segmentation of the second object t2 may also be continuous at the boundary b, as shown in FIG. 6A, but is not limited thereto. The second object t2 may be far from the lens.

The video stabilizer (e.g., the video stabilizer 300 of FIG. 3, etc.) may determine the image data on which the image stabilization operation is to be performed based on the segmentation of the at least one object included in the boundary b of the first region a1 and the second region a2. The first object t1 and the second object t2 may be included in the boundary b. The video stabilizer may determine the image data on which the image stabilization operation is to be performed based on the segmentation of each of the first object t1 and/or the second object t2, etc. The video stabilizer 300 may determine one of the target synthetic image data or the target first image data as the image data on which the image stabilization operation is to be performed according to and/or based on the segmentation.

When the segmentations of the respective at least one object included in the boundary b are all continuous, the video stabilizer may determine the target synthetic image data as the image data on which the image stabilization operation is to be performed. The segmentation of the first object t1 and/or the segmentation of the second object t2 may be all continuous, but the example embodiments are not limited thereto. Because the segmentation of the first object t1 and the segmentation of the second object t2 are all continuous in FIG. 6A, the video stabilizer may determine the target synthetic image data as the image data on which the image stabilization operation is to be performed, etc. The video stabilizer may perform the image stabilization operation on the target synthetic image data.

Figure 6B:
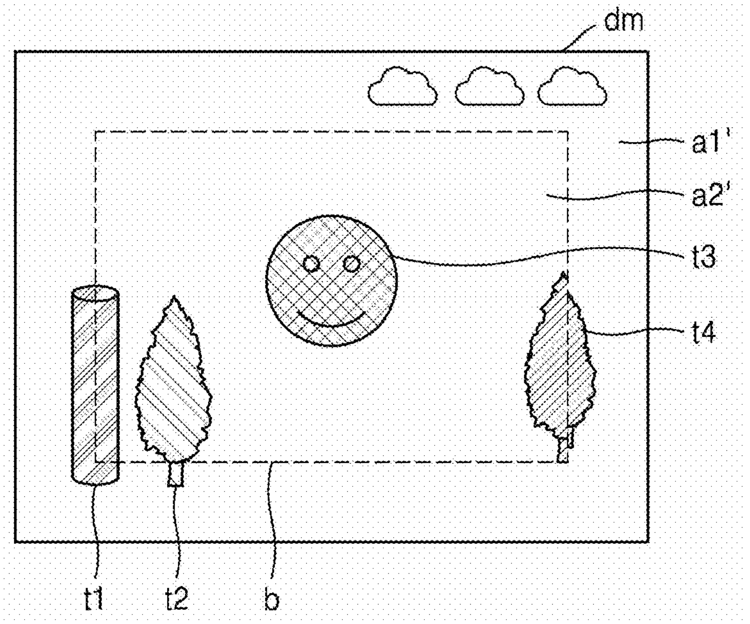
FIG. 6B is a diagram for describing a method of determining image data based on a disparity, according to at least one example embodiment of the inventive concepts.

FIG. 6B is a diagram for describing a method of determining image data based on a segmentation, according to at least one example embodiment of the inventive concepts. Descriptions redundant to the description provided above are omitted.

Referring to FIG. 6B, when the object included in the target synthetic image data is closer to the lens, the segmentation of the object included in the boundary b may be discontinuous, e.g., the object is not properly shown, there is a difference in the size of the object, etc. For example, as shown in FIG. 6B, the segmentation of the fourth object t4 may be discontinuous at the boundary b, but the example embodiments are not limited thereto. The fourth object t4 and the lens may be close to each other, etc.

The first object t1, the second object t2, and the fourth object t4 may be included in the boundary b. The video stabilizer may determine the image data, on which the image stabilization operation is to be performed based on the segmentation of each of the first object t1, the second object t2, and/or the fourth object t4, etc. The video stabilizer 300 may determine one of the target synthetic image data or the target first image data as the image data on which the image stabilization operation is to be performed according to and/or based on the segmentation, etc.

When at least one of the segmentations of the one or more objects included in the boundary b is discontinuous (e.g., the portions of the object from the target synthetic image data and the target first image data are not properly lined up, etc.), the video stabilizer may determine the target first image data as the image data on which the image stabilization operation is to be performed. As shown in FIG. 6B, the segmentation of the fourth object t4 may be discontinuous. Even when the segmentation of the first object t1 and the segmentation of the second object t4 are all continuous, the segmentation of the fourth object t4 is discontinuous, and thus, the video stabilizer may determine the first target image data as the image data on which the image stabilization operation is to be performed, etc. The video stabilizer may perform the image stabilization operation on the target first image data.

Figure 7:
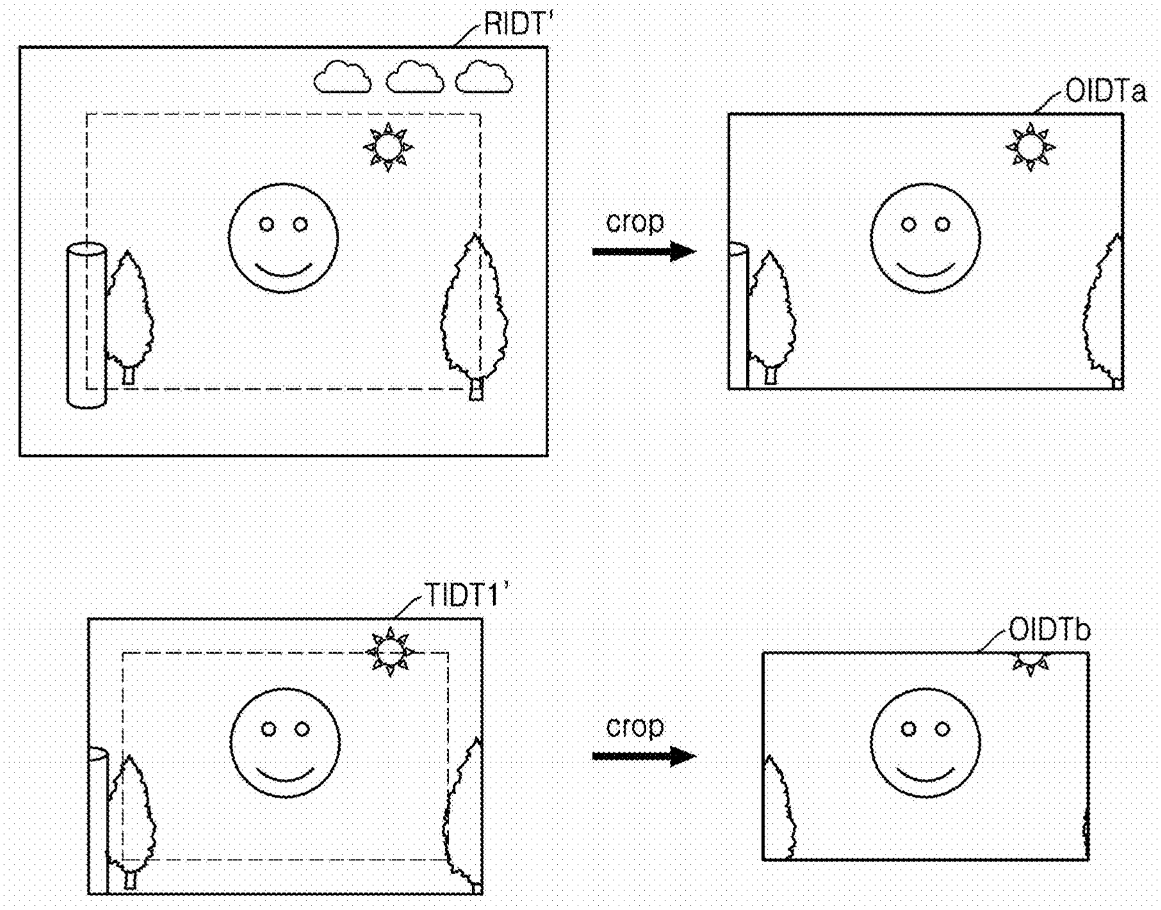
FIG. 7 is a diagram for describing a crop operation according to at least one example embodiment of the inventive concepts.

FIG. 7 is a diagram for describing a crop operation according to at least one example embodiment of the inventive concepts. Descriptions redundant to the description provided above are omitted.

Referring to FIG. 7, target synthetic image data RIDT' on which the image stabilization operation is performed may have the same size as the frame size of the target synthetic image data, but is not limited thereto. Target first image data TIDT1' on which the image stabilization operation is performed may have the same size as the frame size of the first image data, but is not limited thereto. The frame size may denote the image size when the image data is implemented as an image and may be referred to as image size, but the example embodiments are not limited thereto.

When is the video stabilizer determines that the image stabilization operation is to be performed on the target synthetic image data, the video stabilizer performs the image stabilization operation on the target synthetic image data and may generate the target synthetic image data RIDT' on which the image stabilization operation has been performed. The frame size of the target synthetic image data RIDT' may be greater than the frame size of the first image data, but the example embodiments are not limited thereto. The frame size of the target synthetic image data RIDT' may be the same as the second frame size and may be greater than the first frame size, etc.

The video stabilizer may crop the target synthetic image data RIDT', on which the image stabilization operation is performed, to the same size as the target first frame, etc. The video stabilizer may crop the target synthetic image data RIDT' to the same size as the target first frame and may generate output image data OIDTa, but the example embodiments are not limited thereto.

When the video stabilizer determines that the image stabilization operation is not performed on the target synthetic image data, the video stabilizer may perform the image stabilization operation on the target first image data and may generate target first image data TIDT1' on which the image stabilization operation has been performed. The frame size of the target first image data TIDT1' may be the same as the frame size of the first image data, etc.

The video stabilizer may crop the target first image data TIDT1' on which the image stabilization operation has been performed to a size less than the target first frame. The video stabilizer may crop the target first image data TIDT1' to a size smaller than that of the target first frame and may generate output image data OIDTb, etc.

Figure 8:
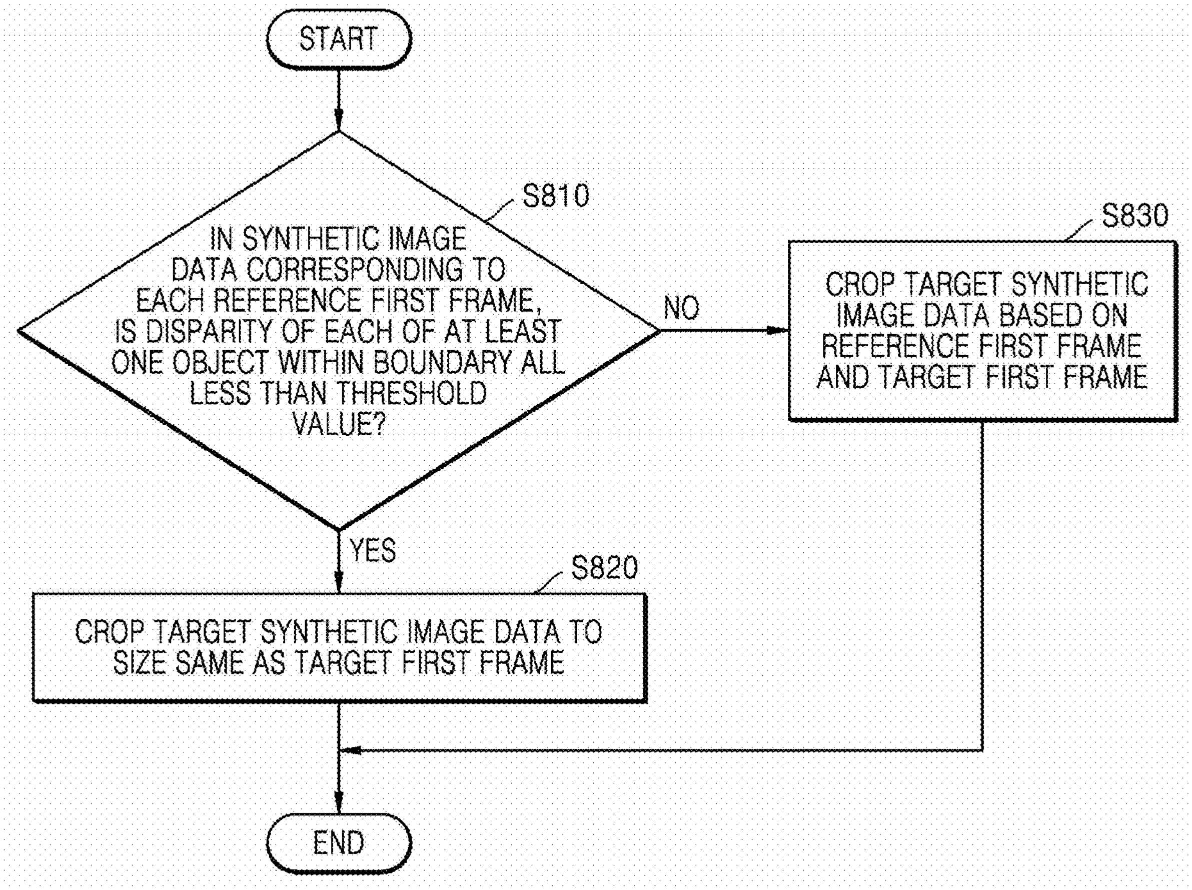
FIG. 8 is a flowchart of a method of cropping target synthetic image data based on a disparity, according to at least one example embodiment of the inventive concepts.

FIG. 8 is a flowchart for describing a method of cropping target synthetic image data based on a disparity, according to at least one example embodiment of the inventive concepts.

When the video stabilizer determines that the image stabilization operation is to be performed on the target synthetic image data, the video stabilizer may adjust the crop size of the target synthetic image data based on distance data corresponding to each of the reference first frames. The reference first frames may denote the target first frame and continuous k frames (where k is a positive integer) following the target first frame, from among the plurality of first frames. The reference first frame may denote k sequential frames after the target first frame. When there is an object close to the lens of the camera module at the boundary of the synthetic image data in the k reference first frames, the corresponding reference first frame may be cropped to be smaller than the frame size of the first frame. The video stabilizer may adjust the crop size of the target synthetic image data by using the reference first frames, and thus, a delayed, unnatural image, distorted image, blurry image, etc., during playing of the video may be improved.

In at least one example embodiment, the distance data corresponding to each of the reference first frames may include the disparity of each of the at least one object included in the boundary between the first region that does not correspond to the reference first frame and the second region corresponding to the first frame, in the synthetic image data corresponding to each of the reference first frames.

In operation S810, the video stabilizer may determine whether the disparities of the at least one object included in the boundary are all less than the desired threshold value in the synthetic image data corresponding to each of the reference first frames. When the disparities of the one or more objects are all less than the desired threshold value, the video stabilizer performs operation S820, and when the disparities of the one or more objects are not all less than the desired threshold value, the video stabilizer may perform operation S830.

In operation S820, when the at least one object disparity is all less than desired and/or preset threshold value in the synthetic image data corresponding to each of the reference first frames, the video stabilizer may crop the target synthetic image data to the same size as the target first frame. In all of the pieces of synthetic image data corresponding respectively to the reference first frames, when the disparities of the at least one object are all less than the desired and/or preset threshold value, the target synthetic image data may be cropped to the same size as the target first frame.

In all of the pieces of synthetic image data corresponding respectively to the reference first frames, when the disparities of the one or more objects are all less than the desired and/or preset threshold value, the disparity of each object included in the boundary of all the pieces of synthetic image data may be less than the desired threshold value. The objects included in the boundary may be far from the lens of the camera module. Because all the reference first frames after the target first frame are cropped to the same size as the target first frame, the video stabilizer may crop the target synthetic image data to the same size as that of the target first frame.

In operation S830, when, in the synthetic image data corresponding to each of the reference first frames, at least one of the disparities of the one or more objects is equal to or greater than the desired threshold value, the video stabilizer may adjust the crop size of the target synthetic image data based on the reference first frame and the target first frame. The video stabilizer may crop the target synthetic image data based on the reference first frame including the object corresponding to the disparity of the desired threshold value or greater and the target first frame.

In the synthetic image data corresponding to each of the reference first frames, when the disparity of the object from among the objects included in the boundary is equal to or greater than the desired threshold value, the synthetic image data including the object corresponding to the disparity of the threshold value or greater may be cropped to be smaller than the frame size of the target first frame. Therefore, the crop size of the target synthetic image data may be adjusted based on the reference first frame including the object corresponding to the disparity of the desired threshold value or greater and the target first frame. In at least one example embodiment, the crop size of the target synthetic image data may be adjusted based on the number of frames between the reference first frame including the object corresponding to the disparity of the desired threshold value or greater and the target first frame. For example, when the number of frames between the reference first frame including the object corresponding to the disparity of the desired threshold value or greater and the target first frame is five, the video stabilizer may crop the target synthetic image data to a size smaller than that of the target first frame, but the example embodiments are not limited thereto, and other values besides five may be used, etc. The frames between the reference first frame including the object corresponding to the disparity of the desired threshold value or greater and the target first frame may be any natural number.

Figure 9A:
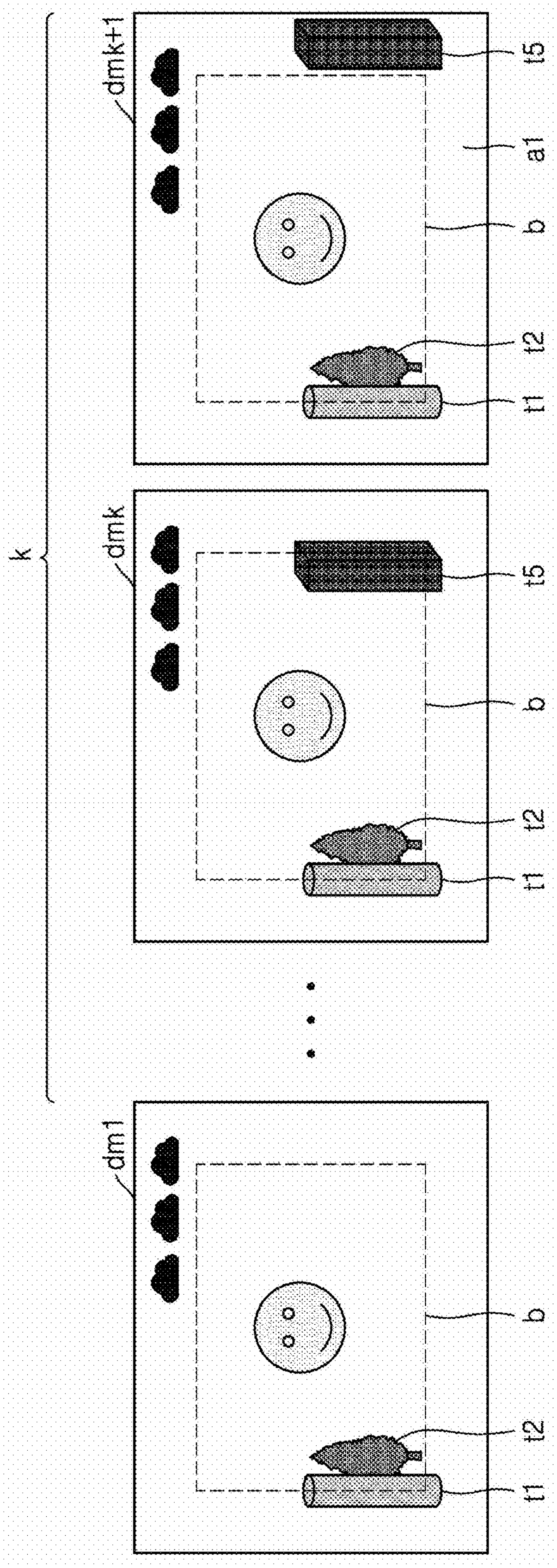
FIG. 9A is a diagram for describing a method of cropping target synthetic image data based on a disparity, according to at least one example embodiment of the inventive concepts.

FIG. 9A is a diagram for describing a method of cropping target synthetic image data based on a disparity, according to at least one example embodiment of the inventive concepts. Referring to FIG. 9A, a depth map dm1 represents the disparity of the target synthetic image data corresponding to the target first frame, but the example embodiments are not limited thereto. After the target first frame, k first frames may be sequentially received by the video stabilizer. A depth map dmk represents the disparity of the synthetic image data corresponding to a (k−1)-th first frame after the target first frame. A depth map dmk+1 represents the disparity of the synthetic image data corresponding to k-th first frame after the target first frame. Descriptions redundant to the description provided above are omitted.

The video stabilizer may determine whether the disparities of the at least one object included in the boundary b are all less than the desired threshold value in the synthetic image data corresponding to each of the reference first frames. In FIG. 9A, the first object t1, the second object t2, and a fifth object t5 may be included in the boundary b of the depth map dmk, but the example embodiments are not limited thereto. The first object t1, the second object t2, and the fifth object t5 may be far from the lens of the camera module, but are not limited thereto. It will be assumed that the disparity of each of the first object t1, the second object t2, and the fifth object t5 is less than the desired threshold value, but the example embodiments are not limited thereto.

The disparity of each object included in the boundary b of the depth map dmk may be all less than the desired threshold value. The disparity of each object included in the boundary of the depth map corresponding to each of the reference first frames may be all less than the desired threshold value. When the disparities of the one or more objects are all less than the desired threshold value, the video stabilizer may crop the target synthetic image data to the same size as that of the target first frame.

Figure 9B:
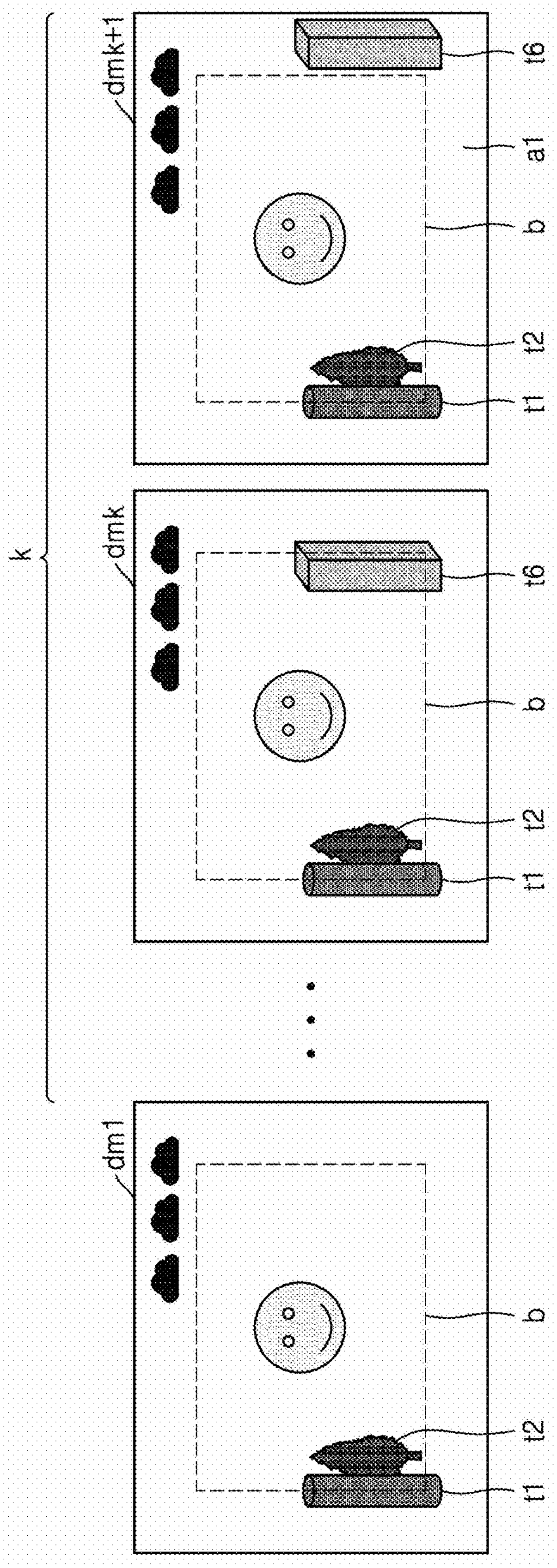
FIG. 9B is a diagram for describing a method of cropping target synthetic image data based on a disparity, according to at least one example embodiment of the inventive concepts.

FIG. 9B is a diagram for describing a method of cropping target synthetic image data based on a disparity, according to at least one example embodiment of the inventive concepts. Descriptions redundant to the description provided above are omitted.

The video stabilizer may determine whether the disparities of the at least one object included in the boundary b are all less than the desired threshold value in the synthetic image data corresponding to each of the reference first frames. The first object t1, the second object t2, and a fifth object t5 may be included in the boundary b of the depth map dmk, but the example embodiments are not limited thereto. The first object t1 and the second object t2 may both be far from the lens of the camera module, and a sixth object t6 may be close to the lens, but the example embodiments are not limited thereto. The disparity of each of the first object t1 and the second object t2 may be less than that of the sixth object t6, etc. It will be assumed that the disparity of the first object t1 and the disparity of the second object t2 are less than the desired threshold value and the disparity of the sixth object t6 is equal to or greater than the desired threshold value.

The disparity of the sixth object t6 included in the boundary b of the depth map dmk may be equal to or greater than the desired threshold value. From among the objects included in the boundary of the depth map corresponding to each of the reference first frames, the disparity of the sixth object t6 in the depth map dmk may be equal to or greater than the desired threshold value. The video stabilizer may adjust the crop size of the target synthetic image data based on the reference first frame corresponding to the depth map dmk including the sixth object t6 and the target first frame. The video stabilizer may adjust the crop size of the target synthetic image data based on the number of frames between the reference first frame corresponding to the depth map dmk and the target first frame.

Because the disparity of the sixth object t6 in the depth map dmk is equal to or greater than the desired threshold value, the synthetic image data corresponding to the depth map dmk may be cropped to be smaller than the target first frame. The video stabilizer may adjust the crop size of the synthetic image data corresponding to each of the target first frame and (k−1) frames after the target first frame, so that the size of the synthetic image data corresponding to each of the target first frame and (k−1) frames after the target first frame may be gradually changed. When the synthetic image data of the (k−1)-th frame after the target first frame is cropped to be smaller than the target first frame, the discontinuity may be expressed in the image. The camera module according to some example embodiments of the inventive concepts may crop the synthetic image data, so that the size of the synthetic image data corresponding to each of the target first frame and (k−1) frames after the target first frame is gradually changed, by using the (k−1) frames after the target first frame, and thus, the continuity in the image may be improved and the delay may be reduced.

Figure 10:
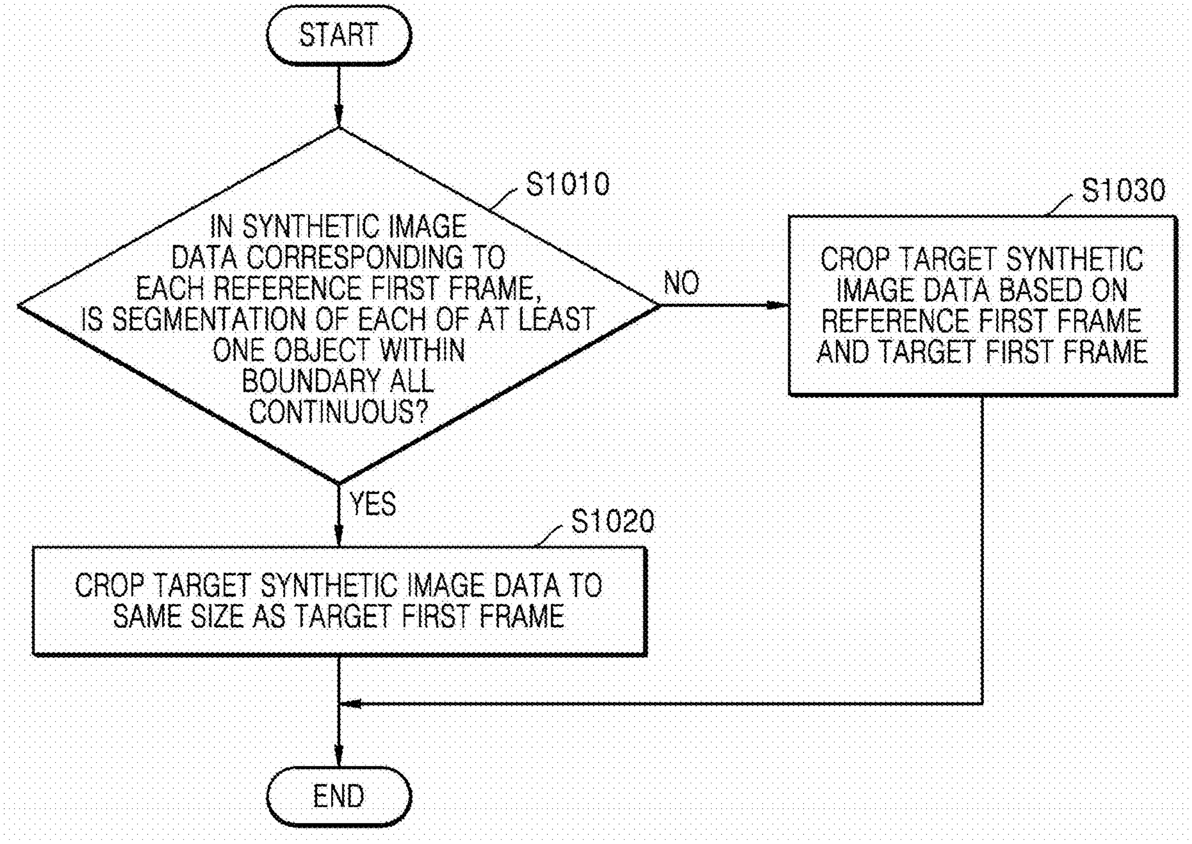
FIG. 10 is a flowchart of a method of cropping target synthetic image data based on a disparity, according to at least one example embodiment of the inventive concepts.

FIG. 10 is a flowchart of a method of cropping target synthetic image data based on a disparity, according to at least one example embodiment of the inventive concepts.

When the video stabilizer (and/or the processing circuitry of the camera module, etc.) determines that the image stabilization operation is to be performed on the target synthetic image data, the video stabilizer may adjust the crop size of the target synthetic image data based on distance data corresponding to each of the reference first frames. The reference first frames may denote the target first frame and continuous k frames (k being a positive integer), from among the plurality of first frames. The reference first frame may denote k sequential frames after the target first frame, but is not limited thereto. When there is an object close to the lens of the camera module at the boundary of the synthetic image data in the k reference first frames, the corresponding reference first frame may be cropped to be smaller than the frame size of the first frame, but the example embodiments are not limited thereto. The video stabilizer may adjust the crop size of the target synthetic image data by using the reference first frames, and thus, a delay and unnatural (e.g., blurry, shaking, unfocused, etc.) image during playing of the video may be improved.

In at least one example embodiment, the distance data corresponding to each of the reference first frames may include the segmentation of each of the one or more objects included in the boundary between the first region that does not correspond to the reference first frame and the second region corresponding to the first frame, in the synthetic image data corresponding to each of the reference first frames, but the example embodiments are not limited thereto.

In operation S1010, the video stabilizer may determine whether the segmentation of the one or more objects included in the boundary is continuous and/or all continuous in the synthetic image data corresponding to each of the reference first frames. The synthetic image data corresponding to each of the reference first frames may be generated by using the first image data of each of the reference first frames and the second image data corresponding to each of the reference first frames, but is not limited thereto. When the segmentation of the one or more objects is continuous and/or all continuous, the video stabilizer performs operation S1020, and when the segmentation of the one or more objects is discontinuous (e.g., not all continuous, etc.), the video stabilizer may perform operation S1030. That is, the video stabilizer may perform operation S1030, when at least one of the segmentations of the one or more objects in at least one piece of the synthetic image data corresponding to each of the reference first frames is discontinuous.

In operation S1020, when the segmentation of each of the one or more objects is continuous and/or all continuous in the synthetic image data corresponding to each of the reference first frames, the video stabilizer may crop the target synthetic image data to the same size as the target first frame. In all of the pieces of synthetic image data corresponding respectively to the reference first frames, when the segmentation of each of the one or more objects is continuous and/or all continuous, the target synthetic image data may be cropped to the same size as the target first frame, etc.

In all of the synthetic image data respectively corresponding to the reference first frames, when the segmentation of each of the one or more objects is continuous and/or all continuous, the objects included in the boundary may be far from the lens of the camera module. Because all the reference first frames after the target first frame are cropped to the same size as the target first frame, the video stabilizer may crop the target synthetic image data to the same size as that of the target first frame, but is not limited thereto.

In operation S1030, when, in the synthetic image data corresponding to each of the reference first frames, at least one of the segmentations of the one or more objects is discontinuous, the video stabilizer may adjust the crop size of the target synthetic image data based on the reference first frame and the target first frame. The video stabilizer may crop the target synthetic image data based on the reference first frame including the object corresponding to the discontinuous segmentation and the target first frame, but is not limited thereto.

Figure 11:
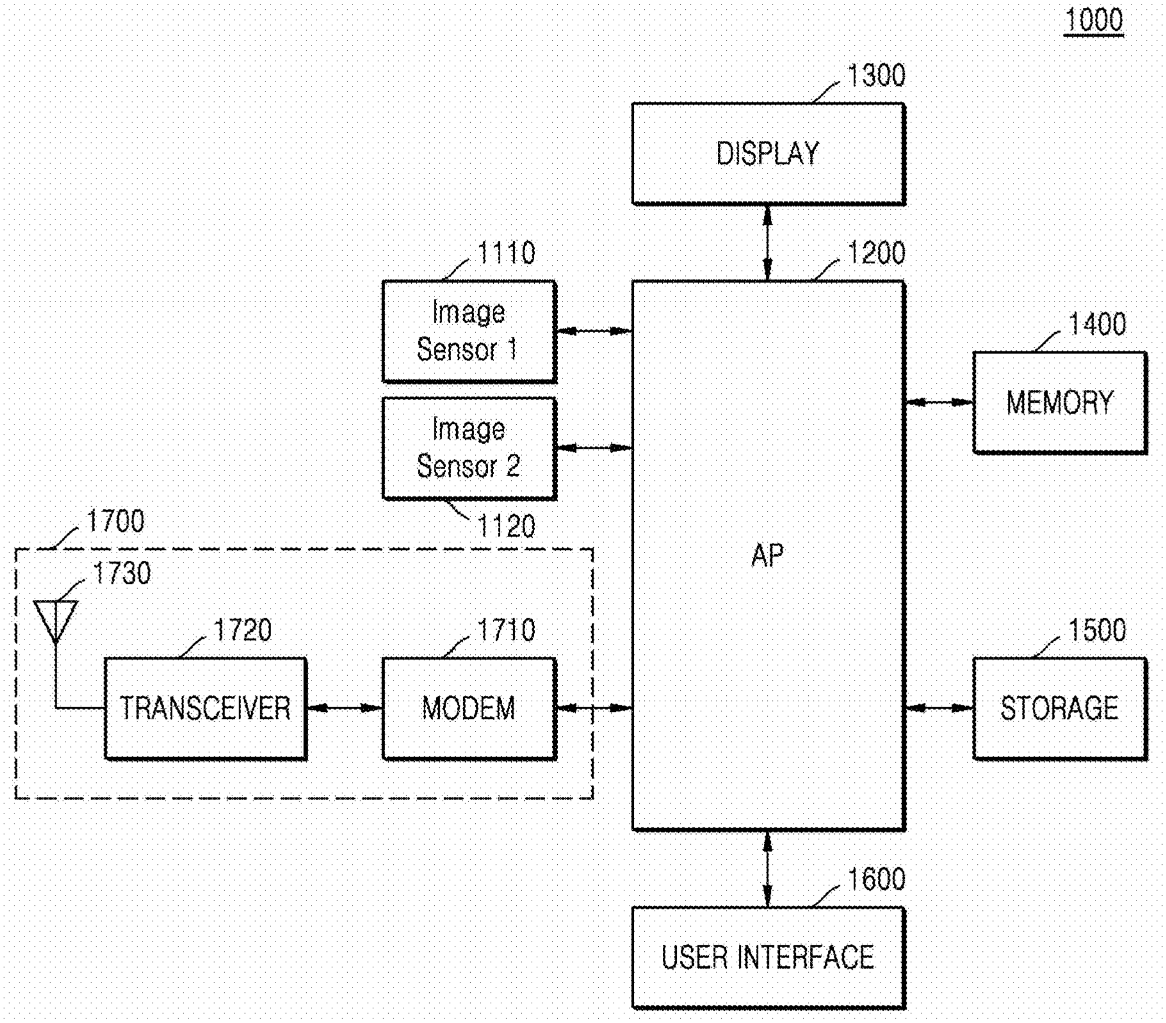
FIG. 11 is a block diagram of an electronic device according to at least one example embodiment of the inventive concepts.

FIG. 11 is a block diagram of an electronic device 1000 according to at least one example embodiment of the inventive concepts.

Referring to FIG. 11, the electronic device 1000 may include a plurality of image sensors, e.g., image sensors 1110 and 1120, etc., at least one application processor 1200, a display 1300, a memory 1400, a storage 1500, a user interface 1600, and/or a wireless transceiver 1700, etc., but the example embodiments are not limited thereto, and for example, the electronic device 1000 may include a greater or lesser number of constituent components. The first image sensor 1110 and the second image sensor 1120 of FIG. 11 may correspond to the first image sensor 100 and the second image sensor 200 of FIG. 1, respectively, but are not limited thereto. According to some example embodiments, the application processor 1200, the memory 1400, the storage 1500, and/or the wireless transceiver 1700, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The application processor 1200 may be provided, for example, as a system-on-chip (SoC) that control overall operations of the electronic device 1000 and drives (e.g., executes, runs, etc.) application programs, an operating system, etc. The application processor 1200 may receive image data from the image sensors 1110 and 1120, and may perform an image processing on the received image data. In some example embodiments, the application processor 1200 may store the received image data and/or processed image data on the memory 1400 and/or the storage 1500, etc. The method of operating the video stabilizer according to some example embodiments of the inventive concepts described above in connection to FIGS. 1 to 10 may be applied to the application processor 1200. In at least one example embodiment, the video stabilizer may be implemented as an integrated circuit separately from the application processor 1200.

The memory 1400 may store programs and/or data processed and/or executed by the application processor 1200. The storage 1500 may be implemented as a non-volatile memory such as NAND flash, a resistive memory, etc., for example, the storage 1500 may be provided as a memory card (e.g., MMC, eMMC, SD, micro SD, etc.), and so on. The storage 1500 may store data and/or programs related to at least one execution algorithm controlling the image processing operation, the image stabilization operation, etc., of the application processor 1200, and the data and/or programs may be loaded on the memory 1400 when performing the image processing operation, the image stabilization operation, etc.

The user interface 1600 may be implemented in various devices capable of receiving user inputs, e.g., a keyboard, a touch panel, a fingerprint sensor, a microphone, a camera, etc. The user interface 1600 may receive the user input and may provide the application processor 1200 with a signal corresponding to the received user input. The wireless transceiver 1700 may include a modem 1710, a transceiver 1720, and/or an antenna 1730, etc.

While various example embodiments of the inventive concepts has been particularly shown and described, it will be understood that various changes in form and details may be made therein without departing from the spirit and scope of the following claims.

What is claimed is:

1. A camera comprising:

a first image sensor configured to generate first image data by converting light incident to the first image sensor via a first lens into at least one first electrical signal, the first image data including a plurality of first frames;

a second image sensor configured to generate second image data by converting light incident to the second image sensor via a second lens into at least one second electrical signal, the second image data including a plurality of second frames; and processing circuitry configured to, generate target synthetic image data based on a target first frame from the plurality of first frames and a target second frame from the plurality of second frames, the target second frame corresponding to the target first frame, determine whether to perform an image stabilization operation on the target synthetic image data based on distance data related to distances between one or more objects included in the target synthetic image data to the first image sensor and the second image sensor, and perform the image stabilization operation based on results of the determination.

2. The camera of claim 1, wherein the processing circuitry is further configured to:

generate the target synthetic image data based on the target first frame and a first region of the target second frame, the first region being a region which does not correspond to the target first frame in the target second frame.

3. The camera of claim 1, wherein the distance data includes disparity information of the one or more objects located on a boundary between a first region and a second region in the target synthetic image data, the first region not corresponding to the target first frame and the second region corresponding to the target first frame; and the processing circuitry is further configured to perform the image stabilization operation on the target synthetic image data in response to the disparity information of the one or more objects being less than a desired threshold value.

4. The camera of claim 3, wherein the processing circuitry is further configured to:

perform the image stabilization operation on the first image data corresponding to the target first frame in response to the disparity information of at least one of the one or more objects being equal to or greater than the desired threshold value.

5. The camera of claim 1, wherein the distance data includes a segmentation of the one or more objects located on a boundary between a first region and a second region in the target synthetic image data, the first region not corresponding to the target first frame and the second region corresponding to the target first frame; and the processing circuitry is further configured to perform the image stabilization operation on the target synthetic image data in response to the segmentation of the one or more objects being continuous.

6. The camera of claim 5, wherein the processing circuitry is further configured to:

perform the image stabilization operation on the first image data associated with the target first frame in response to at least one of the segmentation of the one or more objects being discontinuous.

7. The camera of claim 1, wherein the processing circuitry is further configured to:

perform the image stabilization operation on the target synthetic image data in response to the results of the determination indicating the image stabilization operation is to be performed on the target synthetic image data, the image stabilization operation including, cropping the target synthetic image data on which the image stabilization operation has been performed to a size that is the same as a size of the target first frame.

8. The camera of claim 1, wherein the processing circuitry is further configured to:

perform the image stabilization operation on the first image data of the target first frame in response to the results of the determination indicating the image stabilization operation is not to be performed on the target synthetic image data, the performing the image stabilization operation including cropping the first image data of the target first frame on which the image stabilization operation has been performed to a smaller size than a size of the target first frame.

9. The camera of claim 1, wherein the processing circuitry is further configured to:

in response to the results of the determination indicating the image stabilization operation is to be performed on the target synthetic image data, adjust a crop size of the target synthetic image data based on distance data corresponding to each of k reference first frames after the target first frame, where k is a positive integer.

10. The camera of claim 9, wherein the distance data corresponding to each of the reference first frames includes disparity information associated with the one or more objects located on a boundary between a first region and a second region in synthetic image data corresponding to each of the reference first frames, the first region not corresponding to the reference first frame and the second region corresponding to the reference first frame; and the processing circuitry is further configured to, in response to the disparity information of the one or more objects being less than a desired threshold value in the synthetic image data, crop the target synthetic image data to a same size as a size of the target first frame.

11. The camera of claim 10, wherein the processing circuitry is further configured to:

in response to the disparity information of at least one object of the one or more objects being equal to or greater than the desired threshold value in at least one piece of the synthetic image data corresponding to each of the reference first frames, adjust the crop size of the target synthetic image data based on the reference first frame including the at least one object of the one or more objects corresponding to the disparity information that is equal to or greater than the desired threshold value and the target first frame.

12. The camera of claim 9, wherein the distance data corresponding to each of the reference first frames includes segmentation of the one or more objects located on a boundary between a first region and a second region in synthetic image data corresponding to each of the reference first frames, the first region not corresponding to a respective reference first frame of the reference first frames and the second region corresponding to the respective reference first frame; and the processing circuitry is further configured to, in response to the segmentation of the one or more objects being discontinuous in the synthetic image data corresponding respectively to the reference first frames, crop the target synthetic image data to a same size as a size of the target first frame.

13. The camera of claim 12, wherein the processing circuitry is further configured to:

in response to at least one of the segmentation of the one or more objects being discontinuous in at least one of the synthetic image data corresponding to each of the reference first frames, adjust the crop size of the target synthetic image data based on the respective reference first frame including the one or more objects corresponding to the at least one discontinuous segmentation and the target first frame.

14. A video stabilizer comprising:

processing circuitry configured to, receive first image data of a target first frame generated through a first lens, and second image data of a target second frame generated through a second lens, the second lens having a wider viewing angle than the first lens;

identify image data on which an image stabilization operation is to be performed;

perform the image stabilization operation on the identified image data;

generate target synthetic image data based on a first region in the target second frame and the target first frame, the first region not corresponding to the target first frame; and identify the image data on which the image stabilization operation is to be performed based on information related to distances associated with at least one object located on a boundary between the first region and a second region and the first lens and the second lens, the second region corresponding to the target first frame.

15. The video stabilizer of claim 14, wherein the information includes disparity information associated with the at least one object located on the boundary between the first region and the second region; and the processing circuitry is further configured to, in response to the disparity information of the at least one object being less than a desired threshold value, identify the target synthetic image data as the image data on which the image stabilization operation is to be performed.

16. The video stabilizer of claim 14, wherein the information includes disparity information associated with the at least one object located on the boundary between the first region and the second region; and the processing circuitry is further configured to, in response to the disparity information of the at least one object being equal to or greater than a desired threshold value, identify the first image data as the image data on which the image stabilization operation is to be performed.

17. The video stabilizer of claim 14, wherein the information includes segmentation information associated with the at least one object located on the boundary between the first region and the second region; and the processing circuitry is further configured to, in response to the segmentation information of the at least one object being continuous around the boundary, identify the target synthetic image data as the image data on which the image stabilization operation is to be performed.

18. The video stabilizer of claim 14, wherein the information includes segmentation information of the at least one object located on the boundary between the first region and the second region; and the processing circuitry is further configured to, in response to the segmentation information of the at least one object being discontinuous around the boundary, identify the target first image data as the image data on which the image stabilization operation is to be performed.

19. The video stabilizer of claim 14, wherein the processing circuitry is further configured to adjust a crop size of the image data based on the identified image data.

20. A method of operating a camera, the method comprising:

receiving first image data of a target first frame generated through a first lens and second image data of a target second frame generated through a second lens, the second lens having a wider viewing angle than the first lens;

generating target synthetic image data by rectifying a first region in the target second frame and the target first frame, the first region not corresponding to the target first frame;

identifying image data on which an image stabilization operation is to be performed based on information related to distances of at least one object located on a boundary between the first region and a second region and the first lens and the second lens, the second region corresponding to the target first frame; and performing the image stabilization operation on the identified image data.

* * * * *